(12) United States Patent
Nagano et al.

(10) Patent No.: US 10,273,870 B2
(45) Date of Patent: Apr. 30, 2019

(54) COMBUSTION CHAMBER STRUCTURE OF ENGINE

(71) Applicant: MAZDA MOTOR CORPORATION, Aki-gun, Hiroshima (JP)

(72) Inventors: Takaaki Nagano, Higashihiroshima (JP); Yuji Harada, Higashihiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 0 days.

(21) Appl. No.: 15/579,896

(22) PCT Filed: Jul. 13, 2016

(86) PCT No.: PCT/JP2016/003315
§ 371 (c)(1),
(2) Date: Dec. 5, 2017

(87) PCT Pub. No.: WO2017/017921
PCT Pub. Date: Feb. 2, 2017

(65) Prior Publication Data
US 2018/0171862 A1    Jun. 21, 2018

(30) Foreign Application Priority Data

Jul. 29, 2015   (JP) ................... 2015-149851

(51) Int. Cl.
*F02B 23/10*   (2006.01)
*F02F 3/26*    (2006.01)
(Continued)

(52) U.S. Cl.
CPC .......... *F02B 23/101* (2013.01); *F02B 23/063* (2013.01); *F02B 23/0618* (2013.01);
(Continued)

(58) Field of Classification Search
CPC ...... F02B 19/10; F02B 19/1076; F02B 23/08; F02B 23/10; F02B 23/101; F02B 43/00;
(Continued)

(56) References Cited

U.S. PATENT DOCUMENTS 5,960,767 A * 10/1999 Akimoto ............... F02B 23/101
123/298
2009/0319156 A1* 12/2009 Fujikawa ............. F02B 23/104
701/103

(Continued)

FOREIGN PATENT DOCUMENTS

| JP | 62063122 A | 3/1987 |
|----|------------|--------|
| JP | 2003201846 A | 7/2003 |

(Continued)

OTHER PUBLICATIONS

ISA Japan Patent Office, International Search Report Issued in PCT Application No. PCT/JP2016/003315, dated Aug. 30, 2016, WIPO, 2 pages.

*Primary Examiner* — John Kwon
*Assistant Examiner* — Johnny H Hoang
(74) *Attorney, Agent, or Firm* — Alleman Hall Creasman & Tuttle LLP

(57) ABSTRACT

The present invention relates to a combustion chamber structure of an engine configured to inject fuel in a predetermined operation range in a period from a second half of a compression stroke until a first half of an expansion stroke to perform ignition after a compression top dead center. The combustion chamber structure includes: a piston including a cavity; a fuel injection valve provided at a middle portion of the piston; and a spark plug provided at a radially outer side of the middle portion of the piston and an upper side of the cavity. The cavity is formed by a curved surface having curvature that becomes larger as the curved surface extends toward the radially outer side. A tangential direction of an (Continued)

edge end portion of the curved surface intersects with a combustion chamber ceiling radially outward of the spark plug.

11 Claims, 3 Drawing Sheets

(51) Int. Cl.
    *F02F 3/28*         (2006.01)
    *F02B 23/06*      (2006.01)
    *F02D 41/30*      (2006.01)
    *F02D 41/40*      (2006.01)
    *F02P 15/08*      (2006.01)
    *F02D 37/02*      (2006.01)
    *F02B 23/08*      (2006.01)
    *F02D 41/38*      (2006.01)

(52) U.S. Cl.
    CPC ...... *F02B 23/0669* (2013.01); *F02B 23/0696* (2013.01); *F02D 37/02* (2013.01); *F02D 41/3041* (2013.01); *F02D 41/401* (2013.01); *F02F 3/26* (2013.01); *F02F 3/28* (2013.01); *F02P 15/08* (2013.01); *F02B 2023/085* (2013.01); *F02B 2023/102* (2013.01); *F02D 2041/389* (2013.01); *F02D 2700/10* (2013.01); *Y02T 10/125* (2013.01); *Y02T 10/44* (2013.01)

(58) Field of Classification Search
CPC ... F02B 31/00; F02B 75/38; F02F 1/24; F02F 3/26; F02F 3/28
USPC ........ 123/264–270, 274, 279–281, 305–307, 123/657, 664, 671
See application file for complete search history.

(56) References Cited

U.S. PATENT DOCUMENTS

| | | | |
|---|---|---|---|
| 2012/0216776 A1* | 8/2012 | Nagatsu | F02B 23/101 123/305 |
| 2016/0201551 A1* | 7/2016 | Uchida | F02B 23/101 123/302 |
| 2016/0201596 A1* | 7/2016 | Nagano | F02B 23/0696 123/305 |
| 2016/0201631 A1* | 7/2016 | Nagano | F02M 61/14 123/298 |
| 2017/0167360 A1* | 6/2017 | Wasada | F02B 23/101 |

FOREIGN PATENT DOCUMENTS

| | | |
|---|---|---|
| JP | 2003328759 A | 11/2003 |
| JP | 200411441 A | 1/2004 |
| JP | 2006258053 A | 9/2006 |
| JP | 2012215098 A | 11/2012 |
| JP | 2014043782 A | 3/2014 |

* cited by examiner

COMBUSTION CHAMBER STRUCTURE OF ENGINE

TECHNICAL FIELD

The present invention relates to a combustion chamber structure of an engine, and particularly to a combustion chamber structure of an engine configured to inject fuel in a predetermined operation range in a period from a second half of a compression stroke until a first half of an expansion stroke to perform ignition after a compression top dead center.

BACKGROUND ART

Typically, engines using gasoline or fuel containing gasoline as a major component widely adopt a spark ignition method of performing ignition by a spark plug. To improve fuel efficiency and the like, a technology has been developed in recent years, in which: a high compression ratio (for example, 14 or more) is applied as a geometrical compression ratio of the engine; gasoline or fuel containing gasoline as a major component is used; and in a predetermined operation range, compression self ignition (specifically, homogeneous-charge compression ignition (HCCI)) is performed.

A combustion chamber structure of the engine configured to perform the compression self ignition is disclosed in, for example, PTL 1. Regarding a combustion chamber structure applied to a high compression ratio engine, PTL 1 discloses a technology of improving filling efficiency by configuring the combustion chamber structure such that an inside of a cavity formed on a middle portion of a piston upper surface is adequately scavenged. In addition, an engine configured to perform the compression self ignition is disclosed in, for example, PTL 2.

CITATION LIST

Patent Literature

PTL 1: Japanese Laid-Open Patent Application Publication No. 2014-43782
PTL 2: Japanese Laid-Open Patent Application Publication No. 2012-215098

SUMMARY OF INVENTION

Technical Problem

According to the engine configured to perform the above compression self ignition, in a predetermined operation range (for example, a low-rotation high-load range), to suppress so-called preignition, fuel is injected in a period from a second half of a compression stroke until a first half of an expansion stroke, and forced ignition by a spark plug is performed after a compression top dead center. In this case, since a time from when the fuel is injected until when the fuel is ignited is short, a fuel-air mixture containing the injected fuel cannot be quickly supplied to a vicinity of the spark plug, and therefore, ignitability by the spark plug tends to deteriorate. In addition, since the time from when the fuel is injected until when the fuel is ignited is short, a thick part and thin part of the fuel-air mixture tend to be generated in the combustion chamber, i.e., homogeneity of the fuel-air mixture in the combustion chamber tends not to be secured. When the homogeneity of the fuel-air mixture is not secured as above, the fuel-air mixture containing the fuel is discharged without being combusted, or combustion (afterburning) occurs after a combustion timing. Thus, the fuel efficiency deteriorates. In addition, smoke is generated, and emission also deteriorates.

The present invention was made to solve the above problems, and an object of the present invention is to provide a combustion chamber structure of an engine configured to inject fuel in a period from a second half of a compression stroke until a first half of an expansion stroke to perform ignition after a compression top dead center, the combustion chamber structure being capable of appropriately securing both homogeneity and ignitability of a fuel-air mixture in a combustion chamber.

Solution to Problem

To achieve the above object, the present invention is a combustion chamber structure of an engine configured to inject fuel in a period from a second half of a compression stroke until a first half of an expansion stroke to perform ignition after a compression top dead center, the combustion chamber structure including: a piston including a cavity that is concave downward at a middle portion of an upper surface of the piston; a fuel injection valve provided at a position corresponding to a middle portion of the piston and configured to inject the fuel into the cavity of the piston in the period from the second half of the compression stroke until the first half of the expansion stroke; and a spark plug provided at a position located at a radially outer side of the middle portion of the piston and corresponding to an upper side of the cavity of the piston, the middle portion corresponding to a position where the fuel injection valve is provided, wherein: the cavity of the piston is formed by a curved surface having curvature that becomes larger as the curved surface extends toward the radially outer side; and a tangential direction of an edge end portion of the curved surface intersects with a combustion chamber ceiling located at the radially outer side of a position where the spark plug is provided.

In the present invention configured as above, the curvature of a radially inner side of the curved surface of the cavity is smaller than the curvature of a radially outer side of the curved surface of the cavity (i.e., the curve of the curved surface becomes gentler from the radially outer side toward the radially inner side). Therefore, at an initial stage where the fuel injected from the fuel injection valve collides with the curved surface of the cavity to move along the curved surface toward the radially outer side, the curvature of the curved surface of the cavity along which the fuel-air mixture containing the fuel moves is relatively small. On this account, a movement direction of the fuel-air mixture is not steeply curved by the curved surface of the cavity while the fuel-air mixture is moving. Thus, attenuation of momentum of the fuel-air mixture can be appropriately suppressed. To be specific, according to the present invention, at the initial stage where the fuel-air mixture containing the fuel injected from the fuel injection valve moves along the curved surface of the cavity, relatively large momentum of the fuel-air mixture can be appropriately secured, and the fuel-air mixture can quickly move along the curved surface of the cavity toward the radially outer side.

In the present invention, as the fuel-air mixture moves along the curved surface of the cavity toward the radially outer side, the curvature of the curved surface of the cavity gradually increases. During this movement of the fuel-air mixture, gasification of the fuel proceeds. With this, sensitivity of the fuel-air mixture to the curvature of the curved surface of the cavity decreases. Therefore, the curvature of the curved surface of the cavity hardly influences on the momentum of the fuel-air mixture, and the fuel-air mixture can be appropriately directed by the curved surface having the relatively large curvature. With this, according to the present invention, while maintaining the momentum of the fuel-air mixture moving along the curved surface of the cavity, the fuel-air mixture can move through the edge end portion of the curved surface of the cavity to collide with the combustion chamber ceiling. As a result, the fuel-air mixture colliding with the combustion chamber ceiling can be appropriately divided into the fuel-air mixture moving along the combustion chamber ceiling toward the spark plug and the fuel-air mixture moving along the combustion chamber ceiling toward a space (squish area) between a piston upper surface located at the radially outer side of the cavity and the combustion chamber ceiling.

By moving the fuel-air mixture toward the spark plug as above, a thick part of the fuel-air mixture can be generated in the vicinity of the spark plug, i.e., the fuel-air mixture in the vicinity of the spark plug can be made rich. Thus, ignitability by the spark plug can be appropriately secured.

Further, by moving the fuel-air mixture toward the squish area, homogeneity of the fuel-air mixture in the combustion chamber can be appropriately secured by utilizing air in the squish area. To be specific, by supplying the fuel-air mixture into the squish area, the fuel-air mixture in a substantially uniform state can be quickly generated in the combustion chamber. With this, deterioration of fuel efficiency by unburning or after-burning and deterioration of emission by smoke can be improved.

As above, according to the present invention, both the homogeneity and ignitability of the fuel-air mixture in the combustion chamber can be appropriately secured.

In the present invention, it is preferable that: the edge end portion of the curved surface forming the cavity of the piston be located at the radially outer side of the position where the spark plug is provided; and the tangential direction of the edge end portion of the curved surface extend in a direction along a center axis of the piston.

According to the present invention configured as above, the tangential direction of the edge end portion of the cavity extends in the direction along the center axis of the piston, in other words, extends in a substantially vertical direction. Therefore, the fuel-air mixture can collide with the combustion chamber ceiling in the substantially vertical direction. With this, distributivity of the fuel-air mixture moving toward the spark plug and the fuel-air mixture moving toward the squish area can be effectively secured.

In the present invention, it is preferable that the spark plug be arranged such that an electrode of a tip end portion of the spark plug is located along the combustion chamber ceiling.

According to the present invention configured as above, since the electrode of the spark plug is arranged along the combustion chamber ceiling, the fuel-air mixture in the vicinity of the electrode of the spark plug can be efficiently made rich by the fuel-air mixture moving along the combustion chamber ceiling after colliding with the combustion chamber ceiling.

Advantageous Effects of Invention

According to the combustion chamber structure of the engine of the present invention, in the engine configured to inject the fuel in the period from the second half of the compression stroke until the first half of the expansion stroke to perform the ignition after the compression top dead center, both the homogeneity and ignitability of the fuel-air mixture in the combustion chamber can be appropriately secured.

DESCRIPTION OF EMBODIMENTS

Hereinafter, a combustion chamber structure of an engine according to an embodiment of the present invention will be explained in reference to the drawings.

First, before explaining details of the embodiment of the present invention, a premise configuration of the engine according to the embodiment of the present invention will be briefly explained. The engine according to the embodiment of the present invention drives at a high compression ratio such as a geometrical compression ratio of 14 or more (preferably 18 to 20) and also performs homogeneous-charge compression ignition called HCCI in a predetermined low-load range. Further, in a predetermined operation range (for example, a low-rotation high-load range), to suppress preignition and the like, the engine according to the embodiment of the present invention injects fuel (performs retarded injection) in a period from a second half of a compression stroke until a first half of an expansion stroke to perform ignition after a compression top dead center. Such premise configuration of the engine is realized by control of an ECU (Electronic Control Unit) in a vehicle.

Figure 1:
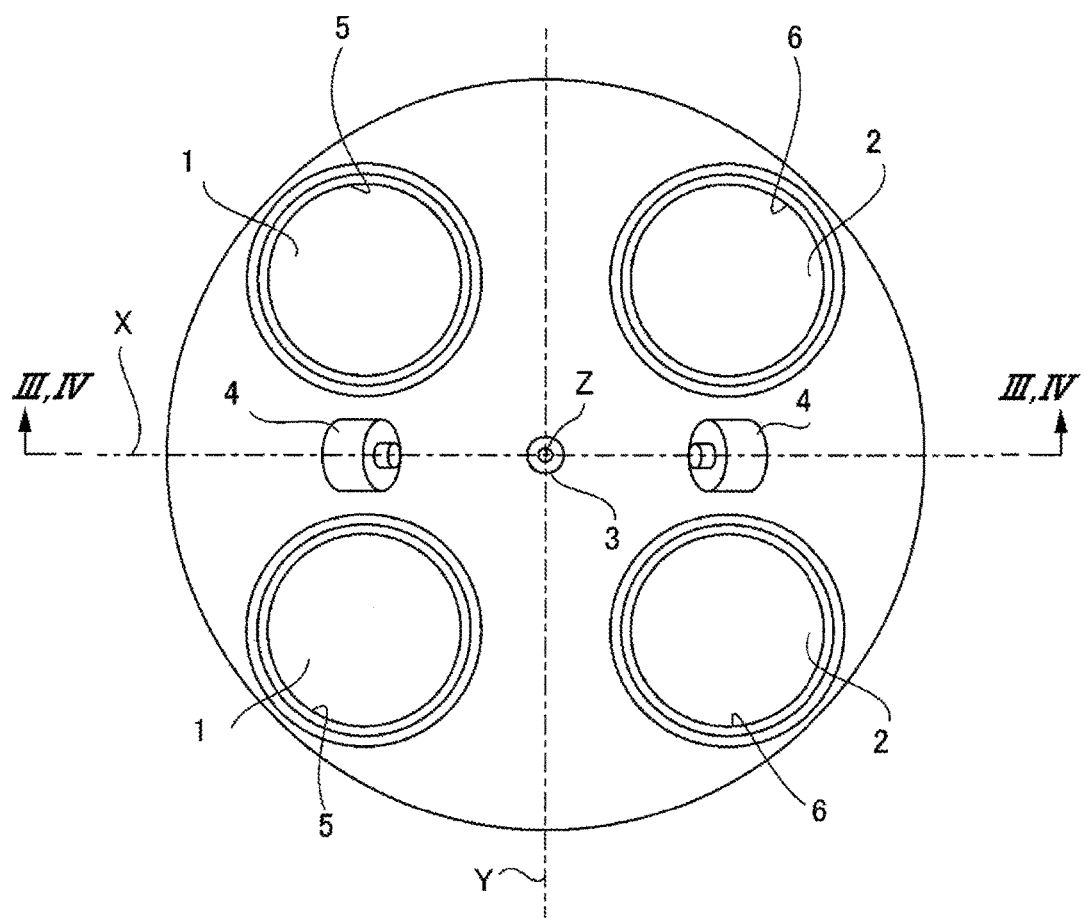
FIG. 1 is a schematic plan view showing one cylinder to which a combustion chamber structure of an engine according to an embodiment of the present invention is applied, when viewed from a lower side in a cylinder axial direction.
Figure 2:
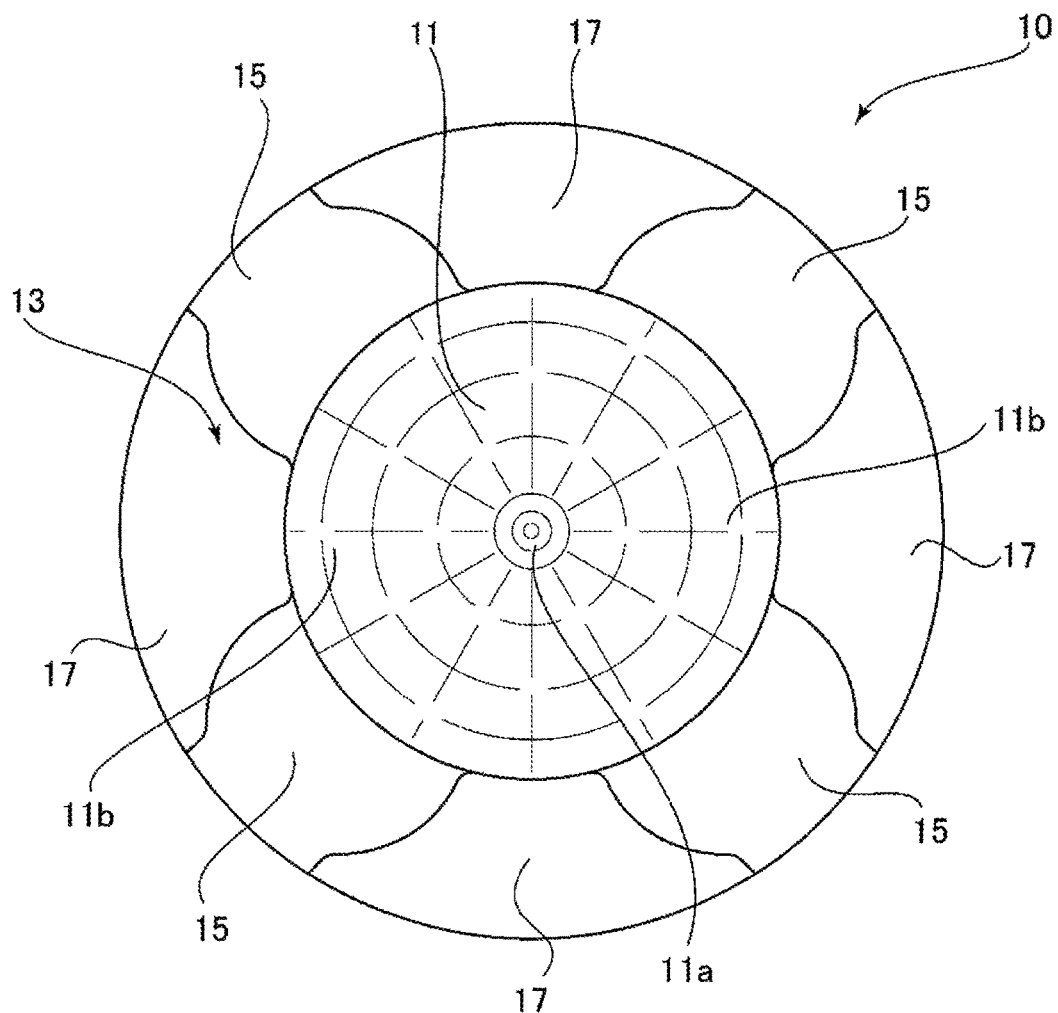
FIG. 2 is a plan view showing a piston according to the embodiment of the present invention when viewed from an upper side in the cylinder axial direction.
Figure 3:
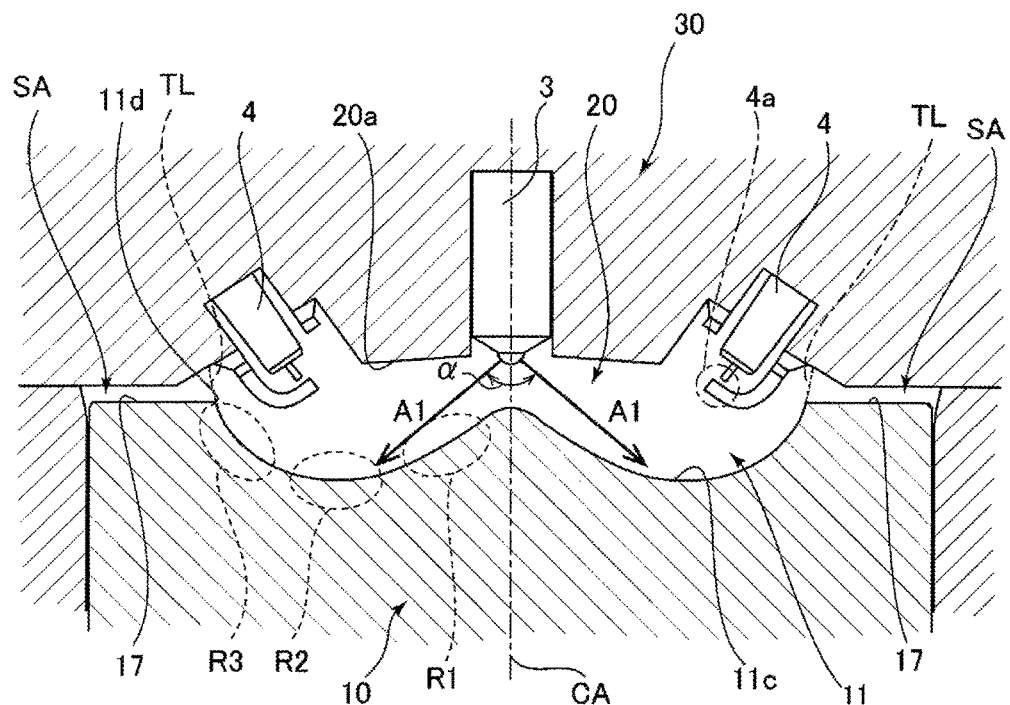
FIG. 3 is a partially sectional view taken along line of FIG. 1 and showing the piston, a cylinder head, and the like according to the embodiment of the present invention.

Next, the combustion chamber structure of the engine according to the embodiment of the present invention will be specifically explained in reference to FIGS. 1 to 3.

FIG. 1 is a schematic plan view showing one cylinder to which the combustion chamber structure of the engine according to the embodiment of the present invention is applied, when viewed from a lower side in a cylinder axial direction. FIG. 2 is a plan view showing a piston according to the embodiment of the present invention when viewed from an upper side in the cylinder axial direction. FIG. 3 is a sectional view taken along line of FIG. 1 and showing a part of the piston, a cylinder head, and the like according to the embodiment of the present invention. It should be noted that FIG. 3 is a diagram when the piston is located at the compression top dead center.

In FIG. 1, a reference sign Z denotes a cylinder axis extending in a direction perpendicular to a paper surface, and a reference sign Y denotes a line segment extending in a paper surface upward/downward direction and corresponding to a crank axis. The engine according to the present embodiment adopts a combustion chamber including a combustion chamber ceiling located at the cylinder head and having a gable roof shape (pent roof shape) (also see FIG. 3). The line segment shown by the reference sign Y corresponds to a pent roof-shaped ridgeline (hereinafter suitably referred to as "pent roof ridgeline") constituting the combustion chamber. Further, a reference sign X denotes a line segment extending through a center of the combustion chamber, i.e., a center axis of the cylinder and perpendicular to the pent roof ridgeline Y. It should be noted that FIG. 3 is a sectional view taken along a surface spreading along the line segment X perpendicular to the pent roof ridgeline Y and showing a part of the piston, the cylinder head, and the like.

As shown in FIG. 1, one cylinder includes two intake valves 1 provided at one of regions (i.e., a left region in FIG. 1) sandwiching the pent roof ridgeline Y. These two intake valves 1 are provided so as to be lined up in a direction along the pent roof ridgeline Y. Reference signs 5 in FIG. 1 denote intake ports that are opened and closed by the respective intake valves 1. Further, the cylinder includes two exhaust valves 2 provided at the other of the regions (i.e., a right region in FIG. 1) sandwiching the pent roof ridgeline Y. The two exhaust valves 2 are provided so as to be lined up in the direction along the pent roof ridgeline Y. Reference signs 6 in FIG. 1 denote exhaust ports that are opened and closed by the respective exhaust valves 2. Furthermore, one fuel injection valve 3 is provided on the cylinder axis Z. In addition, one of two spark plugs 4 is provided between the two intake valves 1, and the other of the two spark plugs 4 is provided between the two exhaust valves 2.

Next, as shown in FIG. 2, a cavity 11 that is concave downward is formed at a middle portion of an upper surface of a piston 10 (also see FIG. 3). Specifically, the cavity 11 is formed to have a substantially circular shape when viewed from a direction along the cylinder axis Z, and a mountain-shaped protruding portion 11a is formed at a middle portion of the cavity 11. A concave portion 11b having a lower height than the protruding portion 11a is formed at a radially outer side of the protruding portion 11a so as to surround the protruding portion 11a. The fuel injection valve 3 is arranged right above the protruding portion 11a of the cavity 11, and the two spark plugs 4 are arranged in the concave portion 11b of the cavity 11 (also see FIGS. 1 and 3).

Further, an upper portion of the piston 10 includes an annular portion 13 extending from an outer edge of the cavity 11 to an outer edge of the upper surface of the piston 10 and surrounding a radially outer side of the cavity 11. The annular portion 13 includes four valve recesses 15 each of which is concave downward by, for example, about 1 mm. These four valve recesses 15 are provided at positions corresponding to the two intake valves 1 and positions corresponding to the two exhaust valves 2. Further, portions 17 each located between the adjacent valve recesses 15 are not concave (i.e., are higher than the valve recesses 15) and are substantially flat. Hereinafter, the portion 17 between the valve recesses 15 is suitably referred to as a "piston upper surface portion 17."

Next, as shown in FIG. 3, the fuel injection valve 3 is provided at a portion of a cylinder head 30, the portion corresponding to the middle portion of the piston 10. Specifically, the fuel injection valve 3 is provided such that a center axis of the fuel injection valve 3 coincides with the cylinder axis Z. The fuel injection valve 3 injects the fuel directly to the combustion chamber 20. The fuel injection valve 3 includes about ten to twelve injection holes (not shown), and the fuel is sprayed from the injection holes so as to form a conical shape that is symmetrical about the cylinder axis Z. In this case, an injection angle α of the fuel injected by the fuel injection valve 3 is set such that the fuel injected based on the control of the ECU in the period from the second half of the compression stroke until the first half of the expansion stroke (for example, 60° after bottom dead center) gets into the cavity 11 of the piston 10 (see arrows A1 of FIG. 3), in other words, the fuel does not collide with the annular portion 13 of the piston 10 or a cylinder side wall (for example, a cylinder liner). Further, the injection angle α of the fuel injection valve 3 is set such that a spray collision distance from a fuel injection position to a position of the cavity 11 with which the fuel collides is larger than a length (division length) from the fuel injection position to a position where an initial division of the fuel occurs.

It should be noted that the injection angle α corresponds to a range in which the spraying of the fuel from the fuel injection valve 3 spreads, the range being defined based on the cylinder axis Z. The injection angle α is set to, for example, about 100°. Further, the fuel is supplied to the fuel injection valve 3 at relatively high fuel pressure (for example, 40 to 120 MPa).

Further, the two spark plugs 4 are provided at portions of the cylinder head 30, the portions being located at a radially outer side of the middle portion of the piston 10 and corresponding to an upper side of the cavity 11 of the piston 10. To be specific, each of the spark plugs 4 is provided at such a position that an electrode 4a of a tip end portion of the spark plug 4 is located within the cavity 11 in a radial direction. Further, each of the spark plugs 4 is arranged such that the electrode 4a is located along a combustion chamber ceiling 20a (in other words, along a lower surface of the cylinder head 30; The same is true in the following explanations). Specifically, each of the spark plugs 4 is provided at the cylinder head 30 such that an inclination direction of the electrode 4a is set along an inclination of the combustion chamber ceiling 20a while suppressing projection of the electrode 4a toward the combustion chamber 20 as much as possible.

Further, the cavity 11 of the piston 10 is formed by a curved surface 11c where the protruding portion 11a and the concave portion 11b are continuous with each other. As is clear from curvatures of surfaces of broken-line regions R1, R2, and R3 in FIG. 3, a curvature of the curved surface 11c of the cavity 11 increases as the curved surface 11c extends toward a radially outer side. For example, a transition curve such as a clothoid curve is applied to the curved surface 11c of the cavity 11. Further, the curved surface 11c of the cavity 11 is formed such that a tangential direction TL of an edge end portion 11d of the curved surface 11c (specifically, a direction of a tangential line at a position of the edge end portion 11d in a sectional view of the curved surface 11c) intersects with the combustion chamber ceiling 20a located at a radially outer side of a position where the spark plug 4 is provided. More specifically, the edge end portion 11d of the curved surface 11c of the cavity 11 is located at a radially outer side of a position corresponding to the electrode 4a of the spark plug 4, and the tangential direction TL extends in a direction along a center axis CA (i.e., the cylinder axis Z) of the piston 10, in other words, the tangential direction TL extends in a substantially vertical direction.

It should be noted that in FIG. 3, an area shown by a reference sign SA denotes a squish area that is a space formed at a gap between the piston upper surface portion 17 and the combustion chamber ceiling 20a. The squish area SA is formed not only at the gap between the piston upper surface portion 17 and the combustion chamber ceiling 20a but also at a gap between the combustion chamber ceiling 20a and each of upper surfaces of the valve recesses 15 (see FIG. 2) provided at positions corresponding to the intake valves 1 and the exhaust valves 2.

Figure 4:
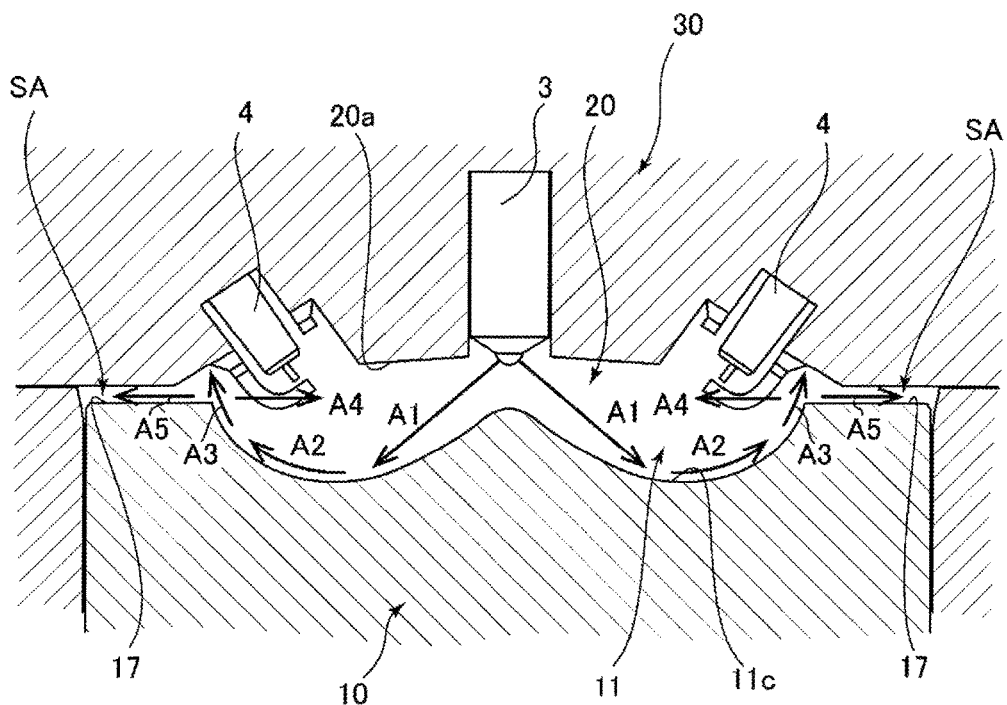
FIG. 4 is a partially sectional view taken along line IV-IV of FIG. 1 and showing the piston, the cylinder head, and the like according to the embodiment of the present invention and is a diagram for explaining operational advantages of the combustion chamber structure of the engine according to the embodiment of the present invention.

Next, operational advantages of the combustion chamber structure of the engine according to the embodiment of the present invention will be explained in reference to FIG. 4. FIG. 4 is a sectional view taken along line IV-IV of FIG. 1 and showing a part of the piston 10, the cylinder head 30, and the like according to the embodiment of the present invention and is a diagram corresponding to FIG. 3.

As shown in FIG. 4, the fuel injected from the fuel injection valve 3 first collides with the cavity 11 of the piston 10 (see the arrows A1). Then, the fuel-air mixture containing the fuel moves along the curved surface 11c of the cavity 11 toward the radially outer side (see arrows A2). In the present embodiment, the curvature of a radially inner side of the curved surface 11c of the cavity 11 is smaller than the curvature of a radially outer side of the curved surface 11c of the cavity 11 (in other words, the curve of the curved surface 11c becomes gentler from the radially outer side toward the radially inner side). Therefore, at an initial stage where the fuel-air mixture containing the fuel injected from the fuel injection valve 3 moves along the curved surface 11c of the cavity 11 toward the radially outer side, the curvature of the curved surface 11c of the cavity 11 along which the fuel-air mixture moves is relatively small. On this account, a movement direction of the fuel-air mixture is not steeply curved by the curved surface 11c of the cavity 11 while the fuel-air mixture is moving. Thus, attenuation of momentum of the fuel-air mixture can be appropriately suppressed. To be specific, at the initial stage where the fuel-air mixture containing the fuel injected from the fuel injection valve 3 moves along the curved surface 11c of the cavity 11, relatively large momentum of the fuel-air mixture can be appropriately secured, and the fuel-air mixture can quickly move along the curved surface 11c of the cavity 11 toward the radially outer side.

As the fuel-air mixture moves along the curved surface 11c of the cavity 11 toward the radially outer side, the curvature of the curved surface 11c of the cavity 11 gradually increases. During this movement of the fuel-air mixture, gasification of the fuel proceeds. With this, influence of the curvature of the curved surface 11c of the cavity 11 on the momentum of the fuel-air mixture gradually decreases. Therefore, the fuel-air mixture can be appropriately directed by the curved surface 11c having the relatively large curvature. With this, while maintaining the momentum of the fuel-air mixture moving as shown by the arrows A2, the fuel-air mixture can move through the edge end portion 11d of the curved surface 11c of the cavity 11 to collide with the combustion chamber ceiling 20a (see arrows A3).

When the fuel-air mixture collides with the combustion chamber ceiling 20a while securing the momentum, the fuel-air mixture disperses to move along the combustion chamber ceiling 20a toward the spark plugs 4 (see arrows A4) and the squish area SA (see arrows A5). In the present embodiment, the tangential direction TL (see FIG. 3) of the edge end portion 11d of the cavity 11 extends in a direction along the center axis CA of the piston 10, in other words, extends in a substantially vertical direction. Therefore, the fuel-air mixture can collide with the combustion chamber ceiling 20a in the substantially vertical direction. With this, distributivity of the fuel-air mixture moving toward the spark plugs 4 and the fuel-air mixture moving toward the squish area SA can be appropriately secured.

By moving the fuel-air mixture toward the spark plugs 4 as above (see the arrows A4), a thick part of the fuel-air mixture can be generated in the vicinity of the electrode 4a of the tip end portion of each spark plug 4, i.e., the fuel-air mixture in the vicinity of the electrode 4a of each spark plug 4 can be made rich. Thus, ignitability by the spark plugs 4 can be appropriately secured. Especially in the present embodiment, since the electrodes 4a of the spark plugs 4 are arranged along the combustion chamber ceiling 20a, the fuel-air mixture in the vicinity of the electrode 4a of each spark plug 4 can be effectively made rich by the fuel-air mixture moving along the combustion chamber ceiling 20a after colliding with the combustion chamber ceiling 20a.

Further, by moving the fuel-air mixture toward the squish area SA (see the arrows A5), homogeneity of the fuel-air mixture in the combustion chamber 20 can be appropriately secured by utilizing air in the squish area SA. To be specific, by supplying the fuel-air mixture to the squish area SA, the fuel-air mixture in a substantially uniform state can be quickly generated in the combustion chamber 20. With this, deterioration of fuel efficiency by unburning or after-burning and deterioration of emission by smoke can be improved.

Next, modified examples of the above embodiment will be explained.

The above embodiment has explained the engine including the combustion chamber 20 having the pent roof shape (see FIG. 3, for example). However, the present invention is also applicable to an engine including a combustion chamber having a shape (such as a semispherical shape or a bathtub shape) other than the pent roof shape.

Further, the above embodiment has explained the engine including the two spark plugs 4. However, the present invention is also applicable to an engine including only one of the two spark plugs 4.

Furthermore, the above embodiment has explained the spark ignition type spark plugs 4. However, the present invention is also applicable to a laser ignition type spark plug.

REFERENCE SIGNS LIST 3 fuel injection valve
4 spark plug
4a electrode of spark plug
10 piston
11 cavity
11c curved surface of cavity
11d edge end portion of cavity
15 valve recess
17 piston upper surface portion
20 combustion chamber
20a combustion chamber ceiling
30 cylinder head
SA squish area

The invention claimed is:

1. A combustion chamber structure of an engine, the combustion chamber structure comprising:
a piston including
a cavity that is concave downward at a middle portion of an upper surface of the piston, and
a mountain-shaped protruding portion that protrudes upward at the middle portion of the cavity;
a fuel injection valve provided at a position corresponding to the middle portion of the piston and configured to inject the fuel into the cavity of the piston in the period from a second half of a compression stroke until a first half of an expansion stroke; and
a spark plug provided at a position located at a radially outer side of the middle portion of the piston and corresponding to an upper side of the cavity of the piston, the middle portion corresponding to a position where the fuel injection valve is provided, wherein:

the engine is configured to inject fuel in a predetermined operation range in a period from the second half of the compression stroke until the first half of the expansion stroke to ignite fuel after a compression top dead center;

the fuel injection valve injects the fuel toward an inclined surface of the protruding portion of the cavity at the compression top dead center;

the cavity of the piston is formed by a curved surface having curvature that becomes larger as the curved surface extends toward the radially outer side;

a tangential direction of an edge end portion of the curved surface intersects with a combustion chamber ceiling located at the radially outer side of a position where the spark plug is provided;

a fuel-air mixture containing the fuel injected from the fuel injection valve collides with the inclined surface of the protruding portion of the cavity and then moves along the curved surface of the cavity to the radially outer side; and the fuel-air mixture further moves through the edge end portion of the cavity and then collides with the combustion chamber ceiling located at the radially outer side of the position where the spark plug is provided.

2. The combustion chamber structure according to claim 1, wherein:

the edge end portion of the curved surface forming the cavity of the piston is located at the radially outer side of the position where the spark plug is provided; and the tangential direction of the edge end portion of the curved surface extends in a direction along a center axis of the piston.

3. The combustion chamber structure according to claim 1, wherein the spark plug is arranged such that an electrode of a tip end portion of the spark plug is located along the combustion chamber ceiling.

4. The combustion chamber structure according to claim 2, wherein the spark plug is arranged such that an electrode of a tip end portion of the spark plug is located along the combustion chamber ceiling.

5. The combustion chamber structure according to claim 1, wherein:

an opening portion of a first intake port and an opening portion of a second intake port are formed on the combustion chamber ceiling so as to be located at the radially outer side of a position where the fuel injection valve is provided; and the spark plug is arranged such that at least an electrode thereof is located between the first intake port and the second intake port.

6. The combustion chamber structure according to claim 1, wherein:

an opening portion of a first exhaust port and an opening portion of a second exhaust port are formed on the combustion chamber ceiling so as to be located at the radially outer side of a position where the fuel injection valve is provided; and the spark plug is arranged such that at least an electrode thereof is located between the first exhaust port and the second exhaust port.

7. The combustion chamber structure according to claim 1, wherein a shape of the cavity when viewed from a cylinder axial direction is a perfect circular shape about a cylinder axis.

8. A combustion chamber structure of an engine, the combustion chamber structure comprising:

a piston including
a cavity that is concave downward at a middle portion of an upper surface of the piston and
a mountain-shaped protruding portion that protrudes upward at the middle portion of the cavity;

a fuel injection valve provided at a position corresponding to the middle portion of the piston and configured to inject the fuel into the cavity of the piston in a period from a second half of a compression stroke until a first half of an expansion stroke; and a spark plug provided at a position located at a radially outer side of the middle portion of the piston and corresponding to an upper side of the cavity of the piston, the middle portion corresponding to a position where the fuel injection valve is provided, wherein:

the engine is configured to inject fuel in a predetermined operation range in the period from the second half of the compression stroke until the first half of the expansion stroke to ignite fuel after a compression top dead center;

a squish area is formed at the radially outer side of the cavity by the piston and a combustion chamber ceiling;

an inclined portion of the combustion chamber ceiling is formed so as to be continuous with the squish area;

the fuel injection valve injects the fuel toward an inclined surface of the protruding portion of the cavity at the compression top dead center;

the cavity of the piston is formed by a curved surface having curvature that becomes larger as the curved surface extends toward the radially outer side;

a tangential direction of an edge end portion of the curved surface intersects with the inclined portion of the combustion chamber ceiling located at the radially outer side of a position where the spark plug is provided;

a fuel-air mixture containing the fuel injected from the fuel injection valve collides with the inclined surface of the protruding portion of the cavity and then moves along the curved surface of the cavity to the radially outer side; and the fuel-air mixture further moves through the edge end portion of the cavity and then collides with the inclined portion of the combustion chamber ceiling located at the radially outer side of the position where the spark plug is provided, and thereby the fuel is distributed to the squish area and the spark plug.

9. The combustion chamber structure according to claim 8, wherein:

the edge end portion of the curved surface forming the cavity of the piston is located at the radially outer side of the position where the spark plug is provided; and the tangential direction of the edge end portion of the curved surface extends in a direction along a center axis of the piston.

10. The combustion chamber structure according to claim 9, wherein the spark plug is arranged such that an electrode of a tip end portion of the spark plug is located along the combustion chamber ceiling.

11. The combustion chamber structure according to claim 8, wherein the spark plug is arranged such that an electrode of a tip end portion of the spark plug is located along the combustion chamber ceiling.

* * * * *